United States Patent [19]

Biffar et al.

[11] Patent Number: 4,895,711

[45] Date of Patent: Jan. 23, 1990

[54] PREPARATION OF HYDROXYLAMMONIUM SALTS

[75] Inventors: Werner Biffar, Frankenthal; Werner Steigleiter, Limburgerhof; Franz-Josef Weiss, Neuhogen, all of Fed. Rep. of Germany

[73] Assignee: BASF Aktiengesellschaft, Ludwigshafen, Fed. Rep. of Germany

[21] Appl. No.: 326,989

[22] Filed: Mar. 22, 1989

[30] Foreign Application Priority Data

Mar. 22, 1988 [DE] Fed. Rep. of Germany ....... 3809554

[51] Int. Cl.$^4$ .............................................. C01B 21/20
[52] U.S. Cl. ................................... 423/387; 423/388; 502/185; 502/339
[58] Field of Search ................................ 423/387, 388

[56] References Cited

U.S. PATENT DOCUMENTS

| | | | |
|---|---|---|---|
| 3,060,133 | 10/1962 | Jockers . | |
| 3,133,790 | 5/1964 | Jockers | 423/388 |
| 3,406,011 | 10/1968 | Zirngibl et al. | 423/387 |
| 3,767,758 | 10/1973 | Mars et al. | 423/387 |
| 3,956,469 | 5/1976 | El-Ghatta et al. | 423/387 |

FOREIGN PATENT DOCUMENTS

| | | |
|---|---|---|
| 0059907 | 9/1982 | European Pat. Off. . |
| 956038 | 12/1956 | Fed. Rep. of Germany . |
| 2500866 | 4/1974 | Fed. Rep. of Germany . |
| 2542421 | 4/1976 | Fed. Rep. of Germany ...... 423/387 |

*Primary Examiner*—Robert L. Stoll
*Assistant Examiner*—Wayne A. Langel
*Attorney, Agent, or Firm*—Keil & Weinkauf

[57] ABSTRACT

Hydroxylammonium salts are prepared by catalytic reduction of nitrogen monoxide with hydrogen in dilute aqueous mineral acids at elevated temperature in the presence of suspended supported platinum catalysts obtainable by precipitating metallic platinum from aqueous solutions of platinum salts onto carriers suspended therein by means of reducing agents in the presence of one or more water-soluble substituted or unsubstituted thioureas.

4 Claims, No Drawings

PREPARATION OF HYDROXYLAMMONIUM SALTS

Hydroxylammonium salts are produced in industry by reducing nitrogen monoxide with hydrogen in the presence of suspended noble metal catalysts in aqueous mineral acids. Many attempts have been made to influence the activity of the catalysts used in such a way that the reduction of nitrogen monoxide leads to the formation of hydroxylammonium salts and any reduction to the by-products such as ammonium salts or dinitrogen oxide is reduced.

DE-C No. 956,038 discloses poisoning platinum catalysts with agents such as sodium sulfide or selenium, arsenic or tellurium compounds in order to favor the formation of hydroxylammonium salts. Similarly, in the process described in DE-A No. 2,500,866 an attempt is made to improve the yield of hydroxylammonium salts by poisoning the platinum catalysts used with sulfites, dithionites or thiosulfate. However, it has been found that the results obtained with the individual catalyst charges fluctuate widely.

DE-C-1,088,037 discloses an attempt to improve the preparation of platinum catalysts by stepwise reduction of platinum(VI) compounds, poisoning with sodium dithionite and subsequent reduction of the platinum(II) compounds to metallic platinum in order to steer the reduction of nitrogen monoxide in the desired direction. However, it has been found that these catalysts, like those above, lose their activity in prolonged use and give rise to increased levels of by-products. Moreover, it proved impossible to eliminate the differences in results from various catalyst charges.

It is an object of the present invention to modify the catalysts in the production of hydroxylammonium salts by catalytic reduction of nitrogen monoxide with hydrogen in such a way that the formation of by-products is substantially minimized, but the catalysts show high activity over a prolonged period, and that the individual catalyst charges vary as little as possible in activity.

We have found that this object is achieved in a process for preparing a hydroxylammonium salt by catalytic reduction of nitrogen monoxide with hydrogen at elevated temperature in a dilute aqueous solution of a mineral acid in the presence of a suspended partially sulfur-poisoned supported platinum catalyst obtainable by precipitating metallic platinum from an aqueous solution of a platinum salt onto a carrier suspended therein by means of a reducing agent in the presence of one or more water-soluble substituted or unsubstituted thioureas.

The novel process has the advantage that the formation of by-products in the hydroxylamine synthesis is substantially suppressed and the catalyst used gives good results even after a long time in use. Furthermore, the novel process has the advantage that the catalyst charges used are more uniform in activity.

In general, a molar ratio of hydrogen:nitrogen monoxide of from 1.5:1 to 6:1 is maintained. Particularly good results are obtained on taking care to ensure that a molar ratio of hydrogen:nitrogen monoxide of from 3.5 to 5:1 is maintained in the reaction zone.

It is advantageous for the acid used to be a strong mineral acid such as hydrochloric acid, nitric acid, sulfuric acid or phosphoric acid. It is also possible to use their acidic salts, for example ammonium bisulfate. Particular industrial importance has been attained by sulfuric acid, ammonium bisulfate and nitric acid. In general, at the start the aqueous acid is from 4 to 6 normal, and in the course of the reaction the acid concentration is not allowed to drop below 0.2N.

The reaction is advantageously carried out at from 30° to 80° C. The range from 35° to 60° C. has proven particularly useful. In general, the reaction is carried out under atmospheric pressure or superatmospheric pressure, for example at up to 30 bar. It has proven particularly advantageous to carry out the reaction under superatmospheric pressure, for example at from 1.5 to 20 bar.

The reaction is carried out in the presence of a supported platinum catalyst. Particular usefulness is possessed by platinum on carbon carriers, for example activated carbon, in particular graphite. Preferably, such a supported catalyst contains from 0.1 to 5% by weight of platinum, in particular from 0.2 to 1% by weight of platinum. It is advantageous to use supported platinum catalysts whose proportions having a particle size <10 μm amount to less than 10% by weight. It is preferred to use a supported platinum catalyst having a particle size of from 30 to 90 μm. The fine proportions of the carrier are easily removable by suitable measures, for example screening.

According to the invention, the catalyst used is obtainable by precipitating metallic platinum from an aqueous solution of a platinum salt onto a carrier suspended therein by means of a reducing agent in the presence of one or more water-soluble substituted or unsubstituted thioureas. In general, the starting point here is an aqueous solution of hexachloroplatinic acid or tetrachloroplatinic acid or a salt thereof. Advantageously, prior to the addition of the thiourea compound the solution is brought to a pH of from 2.0 to 4.0, for example by addition of an alkali metal hydroxide or alkali metal carbonate. It has proven particularly useful to buffer the solution to the pH mentioned, for example by also adding an alkali metal acetate. Such platinum-containing solutions are admixed with one or more water-soluble substituted or unsubstituted thioureas. Advantageously, the amount used per gram atom of platinum is from 0.02 to 2 moles, in particular from 0.05 to 1 mole, of said thioureas.

Preferred thioureas are those of the formula I

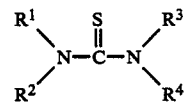

where $R^1$, $R^2$, $R^3$ and $R^4$ may be identical or different and each is hydrogen or lower alkyl, for example of from 1 to 4 carbon atoms, in particular of 1 or 2 carbon atoms. Suitable compounds are for example thiourea, N-methylthiourea, N,N'-dimethylthiourea, N-ethylthiourea and N,N'-diethylthiourea, but particular preference is given to thioureas of the formula I where not more than 2 hydrogens have been replaced. Particular industrial importance has been attained by thiourea itself.

The carrier to be employed is suspended in the solution which contains a platinum salt. The carrier may be introduced from the start or be introduced before the soluble platinum is precipitated by means of a reducing agent. It has proven advantageous to suspend the carrier from the start in the platinum-containing aqueous solution. Metallic platinum is precipitated onto the suspended carrier by means of a reducing agent which reduces platinum to metallic platinum. A suitable reducing agent is for example hydrazine, formaldehyde or formic acid. The use of formic acid has proven particularly useful. It is advantageous to use from 100 to 1000 moles of reducing agent per gram atom of platinum. In general, the reduction to metallic platinum is carried out at from 60° to 90° C. After the reduction has ended, the suspended catalyst is filtered off and advantageously washed with water. The reduction of the platinum salt solution to metallic platinum advantageously takes place in a single step.

In the preparation of a hydroxylammonium salt, the supported platinum catalyst thus obtainable is advantageously employed in an amount of from 20 to 100 g, in particular of from 30 to 80 g, per 1 of aqueous mineral acid.

The above-described preparation of the supported platinum catalyst can also be employed with advantage to regenerate a spent supported platinum catalyst. This comprises treating the spent supported platinum catalyst with dilute chloronitrous acid, for example at from 60° to 90° C. for 12 hours. The resulting suspension of a carrier in a platinum solution is then further processed as described above.

Hydroxylammonium salts are suitable for preparing oximes, for example cyclohexanone oxime, an important starting material for caprolactam.

The process of the invention is illustrated by the following examples:

EXAMPLE 1

50 g of graphite powder having a particle size of from 10 to 100 μm and 0.6637 g (0.0013 g-atom) of hexachloroplatinic(IV) acid are stirred in 43.4 ml of 13.5% strength by weight chloronitrous acid at 80° C. for 17 hours. The suspension obtained is neutralized with sodium carbonate to a pH of 2.75 and then buffered with 2.5 g of sodium acetate. 21.84 mg (0.287 mmol) of thiourea are then added and dissolved. 6.25 ml of concentrated formic acid are added at 80° C. to precipitate metallic platinum from the solution onto the carrier. The solution is stirred until platinum is no longer detectable. The solution is then filtered off, and the catalyst is washed neutral.

4.8 g of the catalyst thus obtained (0.5% by weight of platinum on graphite) are suspended in 120 ml of 4.3N sulfuric acid, and 7.75 l (S.T.P.) of a gas mixture composed of 35.0% by volume of nitrogen monoxide and 65.0% by volume of hydrogen are introduced per hour at 40° C. with stirring for 4 hours at 3,500 r.p.m. A subsequent balance produced from the analytical data shows the following results:

Space-time yield (NO conversion (mol)/(l of sulfuric acid (4.3 N)×hour))=0.942
Hydroxylamine selectivity (Mol of hydroxylamine×100/mol of converted NO)=85.6%

The selectivity for $NH_3$ is 12.5% and for dinitrogen oxide 1.9%.

The results are summarized in the table below.

EXAMPLES 2 AND 3

Examples 2 and 3 are carried out in the same way as Example 1. The results obtained are given in the table. It is evident that the results obtained are significantly more uniform than the results obtained with the comparative examples recited hereinafter.

COMPARATIVE EXAMPLE 1

50 g of graphite powder having a particle size of from 10 to 100 μm and 0.6637 g (0.0013 g-atom) of hexachloroplatinic(IV) acid are stirred in 43.4 ml of 13.5% strength by weight chloronitrous acid at 80° C. for 17 hours, and the resulting suspension is then brought with sodium carbonate to pH 2.75 and then buffered with 2.5 g of sodium acetate. 1.96 ml of a sodium dithionite solution containing 51.5 g of sodium dithionite per liter are then added, followed by 6.25 ml of concentrated formic acid to precipitate the platinum in metallic form onto the carrier while the suspension is stirred at 80° C. The suspension is stirred until platinum is no longer detectable. The catalyst is then filtered off and washed neutral with water.

The hydroxylamine synthesis using the catalyst thus prepared is carried out as described in Example 1. The results are shown in the table below.

COMPARATIVE EXAMPLES 2 AND 3

Comparative Examples 2 and 3 were carried out in the same way as Comparative Example 1. The results obtained are given in the table below. It is evident that the range of variation is larger than that of the examples according to the invention and that the results obtained are less good.

EXAMPLE 4

Catalyst regeneration 50 g of a catalyst (0.5% by weight of platinum on graphite) which had been on stream for a long time and had become comparatively inactive were stirred with 43.4 ml of 13.5% strength by weight chloronitrous acid at 80° C. for 17 hours. The suspension obtained was brought to pH 2.75 with sodium carbonate. 2.5 g of sodium acetate were then added, followed by 23.74 mg of thiourea (0.24 mol/g-atom of Pt). 6.25 ml of concentrated formic acid were then added, and the suspension was stirred at 80° C. to precipitate metallic platinum onto the suspended carrier until platinum was no longer detectable. The catalyst was then filtered off and washed neutral with water.

The hydroxylamine synthesis is carried out as described in Example 1. The results obtained can be seen in the table.

COMPARATIVE EXAMPLE 4

Catalyst regeneration 50 g of a catalyst (0.5% by weight of platinum on graphite) which had been on screen for a long time and had become comparatively inactive were stirred in 43.4 ml of 13.5% strength by weight chloronitrous acid at 80° C. for 17 hours. The suspension obtained was brought to pH 2.75 with sodium carbonate, buffered with 2.5 g of sodium acetate and then admixed with 1.22 ml of a sodium dithionite solution containing 51.5 g of sodium dithionite per liter. 6.25 ml of concentrated formic acid were then added, and the suspension was stirred at 80° C. to precipitate metallic platinum onto the carrier until platinum was no longer detectable in the solution. The catalyst was then filtered off and washed neutral with water.

The hydroxylamine synthesis using the catalyst thus obtained is carried out as described in Example 1. The results obtained can be seen in the table below.

COMPARATIVE EXAMPLE 5

The catalyst was prepared as described in Example 1, except that instead of thiourea 0.04 ml of thiophenol was used. The hydroxylamine synthesis was carried out as described in Example 1. The results obtained can be seen in the table below.

COMPARATIVE EXAMPLE 6

The catalyst was prepared as in Example 1, except that instead of thiourea 47.6 mg of thiodiglycol were used. The hydroxylamine synthesis was carried out as described in Example 1. The results obtained can be seen in the table below.

TABLE

| Catalyst | Sulfur added as | Space-time yield | Selectivity [%] NH$_2$OH | NH$_3$ | N$_2$O |
|---|---|---|---|---|---|
| Example 1 | Thiourea | 0.968 | 85.6 | 12.5 | 1.9 |
| Example 2 | Thiourea | 0.975 | 87.2 | 10.6 | 2.2 |
| Example 3 | Thiourea | 0.975 | 87.6 | 10.4 | 2.0 |
| Example 4 (Regeneration) | Thiourea | 1.005 | 84.7 | 13.5 | 1.9 |
| Comparative Example 1 | Na dithionite | 0.962 | 85.5 | 12.4 | 2.1 |
| Comparative Example 2 | Na dithionite | 0.967 | 82.2 | 15.2 | 2.6 |
| Comparative Example 3 | Na dithionite | 0.960 | 88.5 | 8.9 | 2.6 |
| Comparative Example 4 (Regeneration) | Na dithionite | 0.994 | 81.0 | 17.4 | 1.5 |
| Comparative Example 5 | Thiophenol | 0.955 | 82.9 | 12.8 | 4.3 |
| Comparative Example 6 | Thiodiglycol | 0.975 | 82.2 | 16.5 | 1.3 |
| Example 6 | | | | | |

We claim:

1. In a process for preparing a hydroxylammonium salt by the catalytic reduction of nitrogen monoxide with hydrogen at an elevated temperature in a dilute aqueous mineral acid, the improvement which comprises: preparing a support platinum catalyst by precipitating metallic platinum from an aqueous solution of a platinum salt onto a carrier suspended in the solution by means of a reducing agent in the presence of one or more water-soluble substituted or unsubstituted thioureas, and carrying out said reduction in the presence of said supported platinum catalyst suspended in the dilute aqueous mineral acid.

2. The process of claim 1, wherein the catalyst is prepared in the presence of a thiourea of the formula I

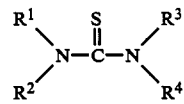

where $R^1$, $R^2$, $R^3$ and $R^4$ may be identical or different and each is hydrogen or alkyl of from 1 to 4 carbon.

3. The process of claim 1, wherein the catalyst is prepared in the presence of thiourea.

4. The process of claim 1, wherein per gram-atom of platinum from 0.002 to 2 moles of a water-soluble substituted or unsubstituted thiourea are used.

* * * * *

UNITED STATES PATENT AND TRADEMARK OFFICE
CERTIFICATE OF CORRECTION

PATENT NO. : 4,895,711

DATED : January 23, 1990

INVENTOR(S) : Werner BIFFAR et al.

It is certified that error appears in the above-identified patent and that said Letters Patent is hereby corrected as shown below:

Claim 4 - line 2 should read: "platinum from 0.02 to 2 moles of ..."

not as: " platinum from 0.002 to 2 moles of..."

Signed and Sealed this

Sixteenth Day of April, 1991

Attest:

HARRY F. MANBECK. JR.

Attesting Officer

Commissioner of Patents and Trademarks